United States Patent Office 2,818,215
Patented Dec. 31, 1957

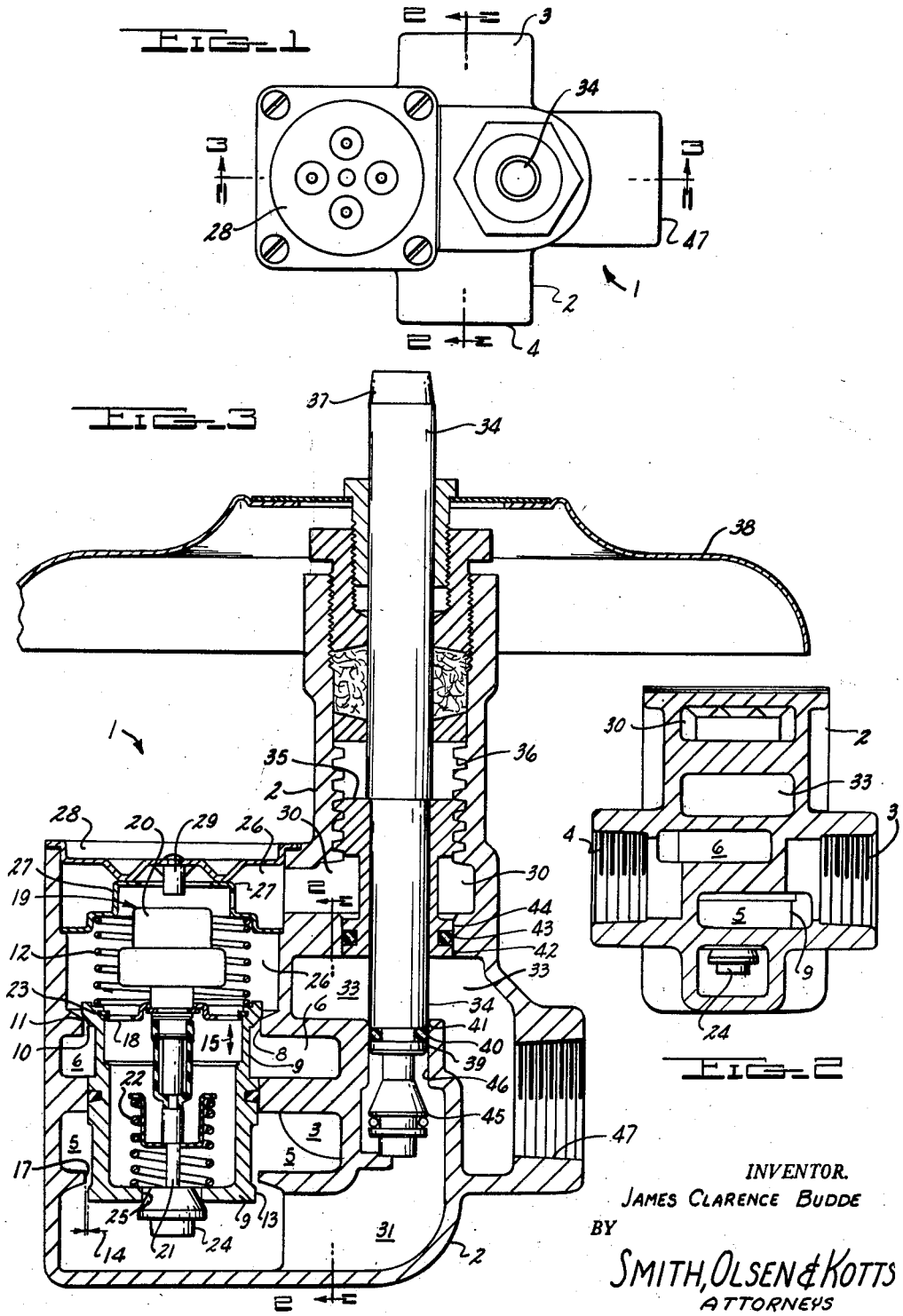

2,818,215

MIXING VALVE CONSTRUCTION

James Clarence Budde, Detroit, Mich., assignor, by mesne assignments, to American Radiator & Standard Sanitary Corporation, New York, N. Y., a corporation of Delaware Application September 2, 1955, Serial No. 532,201

8 Claims. (Cl. 236—12)

This invention relates to a valve for mixing hot and cold fluids. One application of the invention is in the mixing of hot and cold water prior to passage through a conventional shower head or tub tap.

One object of the invention is to provide a valve construction for mixing hot and cold fluids wherein an effective mixing action is produced. This object is achieved in part by providing the valve construction with two mixing chambers so as to subject the hot and cold fluids to two separate mixing actions. In one mixing chamber the hot and cold fluids are mixed so as to form an intermediate temperature fluid, and in the second mixing chamber the intermediate temperature fluid and additional cold fluid are mixed so as to produce a fluid of a temperature between that of the cold and intermediate temperature fluids. Temperature of the intermediate fluid is precisely controlled by a thermostat in the first mixing chamber operating in conjunction with a valve for metering the amount of cold fluid into said chamber in accordance with the temperature of fluid surrounding the thermostat.

Another object is to provide for varying the temperature of the fluid issuing from the valve construction. This object is achieved by employing a valve means for varying the relative proportions of intermediate temperature fluid and cold fluid into the second mixing chamber.

Another object is to provide for automatically stopping the flow of hot fluid through the valve construction in the event that the cold fluid supply is inadvertantly cut off. This feature of the invention is particularly desirable in the case where the valve construction is employed in conjunction with a shower head, it being appreciated that a spray of extremely hot water through the shower head would scald or burn the person using the shower. Automatic stoppage of the hot fluid is effected by employing in the valve construction a valve body for controlling and stopping the flow of hot fluid. The valve body is responsive to hot and cold fluid pressures, and a spring is provided for biasing the valve body to a position stopping the flow of hot fluid when the cold fluid ceases to exert a force on the valve body, as when the supply of cold fluid to the valve construction is cut off.

Another object is to provide mechanism for varying the amount of fluid issuing from the valve construction. This object is achieved by so constructing the aforementioned "temperature varying valve means" that said means doubles as a mechanism for varying the total volume of fluid into the second mixing chamber.

Another object is to achieve the above mentioned objects with a valve construction of low cost. This object is achieved in part by constructing the hot fluid controlling valve body with a central passage therein. This central passage interconnects the cold fluid chamber and first mixing chamber, and the aforementioned metering valve and thermostat are both mounted on the valve body. The valve body acts as a hot fluid controlling means, a conduit for cold fluid, a mount for the metering valve, and a mount for the thermostat.

Other objects of this invention will appear in the following description and appended claims, reference being had to the accompanying drawings forming a part of this specification wherein like reference characters designate corresponding parts in the several views.

In the drawing:

Fig. 1 is an elevational view of one embodiment of the invention, but with an ornamental cap member 38 removed for illustration purposes, Fig. 2 is a sectional view on line 2—2 in Figs. 1 and 3, Fig. 3 is a sectional view on line 3—3 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a mixing valve construction 1 comprising a housing 2 which is provided with a cold fluid inlet port 3 and a hot fluid inlet port 4. Conventional valves (not shown) are provided for controlling the flow of fluids to these ports 3 and 4. These conventional valves will hereinafter be referred to as "inlet valves."

Cold fluid port 3 connects with a cylindrical cold fluid chamber 5, and hot fluid port 4 connects with a cylindrical hot fluid chamber 6. Chamber 5 is provided with an exit port 7, and chamber 6 is provided with an exit port 8. A valve body 9 extends through chambers 5 and 6. Body 9 includes a valve surface 10 seatable against the exit edge or face 11 of port 8, and resilient means in the form of a compression coil spring 12 is provided for urging valve body 9 to a position wherein surface 10 seats against face 11. Body 9 is provided with a cylindrical fluid metering surface 13 which is of lesser diametrical dimension than port 7. There is thus provided an annular clearance space 14 which in the illustrated embodiment has a radial dimension of about .003 inch. Under the influence of fluid pressures in chambers 5 and 6 body 9 will slide up and down in the directions of arrows 15. However, even when body 9 is in the "up" position, surface 13 will be radially spaced from the cylindrical surface 17 of port 7.

There is fixedly secured in valve body 9 a disc 18 which serves to mount a thermostat means 19 (similar in construction to mechanism 58 shown in United States Patent No. 2,657,859). Thermostat means 19 includes a thermostat casing 20, and within casing 20 there is provided a body of thermo-expansible material (not shown). A piston 21 extends into casing 20 and is movable outwardly thereof in response to expansible movement of the thermo-expansible material. A compression coil spring 22 is provided for urging piston 21 into casing 20 in response to contractive movement of the thermo-expansible material. Spring 22 also holds disc 18 against a retainer ring 23 and thereby serves to aid in mounting thermostat means 19 on body 9. The lower end of piston 21 is fixedly connected to a metering valve 24 which is seatable against a passage-forming aperture 25 in body 9.

Operation of the mechanisms thus far described is such that when hot and cold fluids flow from chambers 6 and 5 through ports 8 and 7, the hot fluid will flow around casing 20 so as to expand the thermo-expansible material and cause piston 21 to move outward from casing 20. Metering valve 24 will thereby be opened to allow cold fluid from chamber 5 to pass through aperture 25 and upwardly into mixing relationship with the hot fluid surrounding casing 20. The temperature of fluid around casing 20 is thereby lowered so as to contract the thermo-expansible material and close valve 24. In this manner the temperature of fluid surrounding casing 20 is maintained at a predetermined temperature intermediate that of the hot and cold fluids. When the valve construction is used in conjunction with a shower head, this predetermined intermediate temperature is preferably about 116° F.

Because of the "mixing" function of thermostat means 19, the chamber in which it is mounted may be designated as a "hot and cold fluid mixing chamber." This chamber is designated by the numeral 26, and within this chamber is an apertured cup 27 for seating one end of spring 12. A cover plate 28 serves to hold cup 27 in place, and a post 29 serves as a stop to limit the upward movement of thermostat means 19.

The intermediate temperature fluid from chamber 26 discharges through a passage 30, and part of the cold fluid through port 7 discharges into a passage 31. Valve means 32 is provided for controlling the flow of cold and intermediate temperature fluids in passages 31 and 30.

A second "mixing" chamber 33 is provided for mixing the fluids from passages 31 and 30. In order to more clearly differentiate chamber 33 from mixing chamber 26, chamber 33 will hereinafter be referred to as an "exit chamber."

Valve means 32 includes a shaft or stem 34 having fixedly secured thereon an externally threaded sleeve 35. The threads on sleeve 35 mesh with internal threads 36 formed in housing 2 so as to adapt shaft 34 for axial movement when a manual rotatable force is applied on its outer end portion 37. A knob (not shown) is secured on end portion 37 to aid the user of the apparatus to more easily rotate the shaft, and an ornamental cap 38 is adjustably secured on housing 2 for concealing any enlarged unattractive opening which it may be necessary to form in the wall (not shown) in which construction 1 is installed.

The axial motion of shaft 34 causes chamber 33 to be alternately (1) closed to both passages 30 and 31, (2) opened to passage 31 while closed to passage 30, (3) opened to both passages 30 and 31, or (4) opened to chamber 30 while closed to chamber 31. In the illustrated position chamber 33 is closed to both passages 30 and 31. Valve surface 39, sealing ring 40, and valve surface 41 close chamber 33 to passage 31; and valve surface 42, sealing ring 43, and valve surface 44 close chamber 33 to passage 30. Upward axial movement of shaft 34 causes the lower edge of surface 39 to be exposed to chamber 33 before the lower edge of surface 44 is exposed to passage 30. By manually rotating shaft 34, it is thereby possible to open chamber 33 to passage 31 while retaining chamber 33 closed to passage 30. A further manual rotation of shaft 34 causes chamber 33 to be opened to both passages 31 and 30 in varying amounts (depending on the axial positions of surfaces 39 and 42). A still further manual rotation of shaft 34 causes a valve surface 45 to sealingly engage the cylindrical surface 46 of passage 31 and thereby close chamber 33 to passage 31; at this time chamber 33 is still opened to passage 30.

Operation of the complete mechanism is such that when the cold and hot fluid inlet valves are opened and shaft 34 is in its illustrated position, there is no fluid flow through the valve construction due to the back pressures which exist in passages 30 and 31 (by reason of the "closed" conditions of valve surfaces 39, 41, 42, 43, and sealing rings 40, 43).

Manual rotation of shaft 34 causes chamber 33 to be opened to passage 31 and thereby permits cold fluid to move from chamber 5, through port 7, passage 31, chamber 33 and out through outlet 47.

Further manual rotation of shaft 34 causes chamber 33 to be opened to both passages 31 and 30. When the back pressure in chamber 30 is reduced by opening of passage 42 the fluid in chamber 6 flows into chamber 21 and exerts an upward pressure on the lower horizontal face of body 9. Thus, as passage 42 begins to be opened valve surface 45 begins to restrict the amount of fluid through passage 46; as a result the pressure in chamber 31 becomes greater than the pressure in chamber 30, and body 9 moves up to open port 8. Hot fluid from chamber 6 is thereby enabled to flow through port 8, mixing chamber 26, passage 30, chamber 33 and outlet 47. It will be recalled that even when port 8 is fully opened (with casing 20 against post 29) there exists a clearance space 14 between port 7 and surface 13. This clearance space permits cold fluid from chamber 5 to enter passage 31. Part of this cold fluid flows through passage 25 (by reason of the valve 24 opening action of thermostat means 19), and the remainder of this fluid flows through passage 31 into exit chamber 33 where it is mixed with the "intermediate temperature" fluid issuing from passage 30.

As the rotation of shaft 34 is continued, the opening from passage 30 into chamber 33 becomes larger and the opening from passage 31 into chamber 33 becomes smaller. As a result the flow of "intermediate temperature" fluid into chamber 33 becomes greater and the flow of cold fluid into chamber 33 becomes less. The final result is that the temperature of fluid issuing from outlet 47 is gradually increased during continued rotation of shaft 34.

Further manual rotation of shaft 34 causes chamber 33 to be closed to passage 31 while remaining open to passage 30. The flow of cold fluid through passage 31 directly into chamber 33 is cut off. However, clearance space 14 permits cold fluid to flow through passage 25 and mix with hot fluid from port 8. The fluid issuing from outlet 47 will be at the aforementioned "predetermined intermediate temperature."

In the case when valve construction 1 is utilized with a shower head (not shown) it is desirable to automatically cut off the flow of hot fluid through outlet 47 in the event that the supply of cold fluid is inadvertantly cut off (as by the user failing to turn on the cold fluid inlet valve). Otherwise the shower user would scald or burn himself. To provide for this automatic cut off of hot fluid spring 12 is made strong enough to prevent opening of port 8 when only the hot fluid in chamber 6 acts against body 9, but weak enough to permit opening of port 8 when both the hot and cold fluids act against body 9. Thus, if the supply of cold fluid to chamber 5 is suddenly cut off spring 12 automatically moves to its illustrated position so as to prevent any fluid flow through outlet 47.

In normal operation mixing chambers 26 and 33 provide a thorough mixing action, and rotation of shaft 34 permits temperature control of the issuing fluid in a range extending from cold to the "predetermined intermediate" temperature. Shaft 34 also functions as a manual control for varying the amount of water issuing from outlet 47 (by varying the size of valve openings between chamber 33 and passages 30, 31).

The construction and placement of valve body 9 is such that it acts as a hot and cold fluid controlling means, a conduit for cold fluid, a mount for metering valve 24, and a mount for thermostat means 19. As a result the valve construction is a relatively simple and low cost item.

I claim:

1. A mixing valve construction comprising a housing having a hot fluid chamber and a cold fluid chamber, each of said chambers having exit ports; a valve body slidably extending through said chambers for reciprocal movement from one exit port toward the other; said valve body having a central passage therethrough and putting the exit ports in communication with one another; said valve body having a valve surface seatable against the hot fluid chamber exit port and a fluid metering surface movable toward and away from the cold fluid chamber exit port; a cold fluid-hot fluid mixing chamber in communication with and positioned adjacent the hot fluid chamber exit port and valve body passage; resilient means biasing said valve body to a position wherein said valve surface seats against the hot fluid chamber exit port and said metering surface is at a maximum distance away from the cold fluid chamber exit port; a valve for closing and opening said passage means; and thermostat means in said mixing chamber having thrust means connected with the valve for closing said valve when the fluid temperature in the mixing chamber is below a predetermined temperature and opening the valve when the fluid temperature in the mixing chamber rises above said predetermined temperature.

2. The combination of claim 1 wherein the metering surface is at all times spaced from the cold fluid exit port.

3. The combination of claim 1 wherein the valve surface and metering surface are formed by annular wall portions positioned on the exit sides of the respective ports; and the resilient means is strong enough to prevent opening of the hot fluid exit port when the only fluid exerting a pressure on the valve body is hot fluid but weak enough to permit opening of the hot fluid exit port when both hot and cold fluids exert pressures against the valve body.

4. The combination of claim 1 wherein a resilient means is positioned between the thrust means and an interior surface of the valve body whereby to urge the valve to a closed position.

5. The combination of claim 1 wherein the resilient means takes the form of a compression coil spring positioned between one wall of the mixing chamber and the end of the valve body adjacent the hot fluid exit port.

6. The combination of claim 1 wherein the thermostat means includes a casing containing a mass of thermally expansible material, and the thrust means includes a piston extending from said casing for outward movement relative thereto in response to volumetric increase of the thermally expansible material.

7. The combination of claim 6 wherein an apertured plate extends across the valve body, and the casing includes a shoulder portion seated on the face of the plate exposed to the aforementioned valve; there being a compression coil spring between the piston and valve body for retaining said shoulder portion in its seated position.

8. The combination of claim 1 and further including an exit chamber; first passage means between the exit chamber and cold fluid chamber exit port; second passage means between the exit chamber and mixing chamber; and valve means for alternately (1) closing said exit chamber to both of said passage means (2) opening said exit chamber to said first passage means while closing said exit chamber to said second passage means (3) opening said exit chamber to both of said passage means, or (4) opening said exit chamber to said second passage means while closing said exit chamber to said first passage means.

References Cited in the file of this patent

UNITED STATES PATENTS

| | | |
|---|---|---|
| 2,578,796 | Gillette | Dec. 18, 1951 |
| 2,714,488 | Wangenheim | Aug. 2, 1955 |